P. S. DEVLAN.
Car Brake.
No. 1,754
32,758.
Patented July 9, 1861.
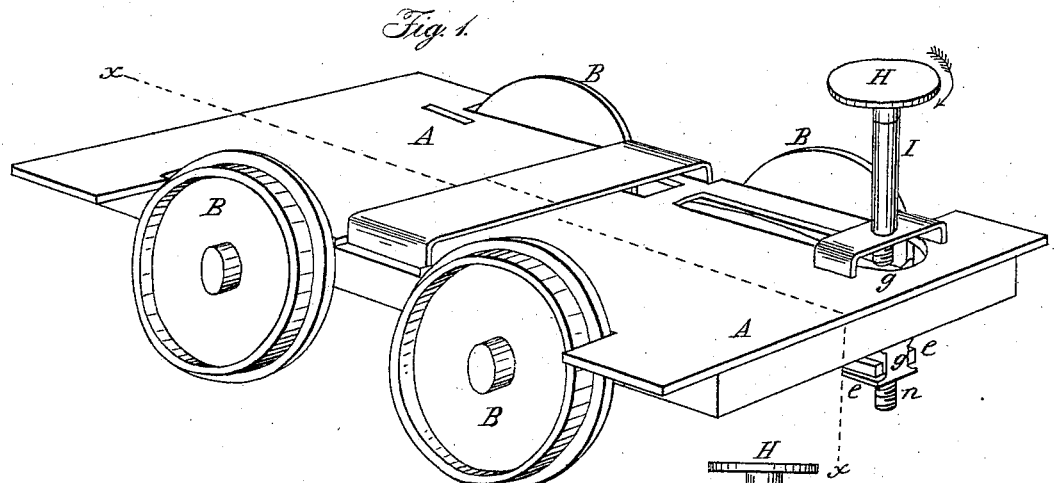
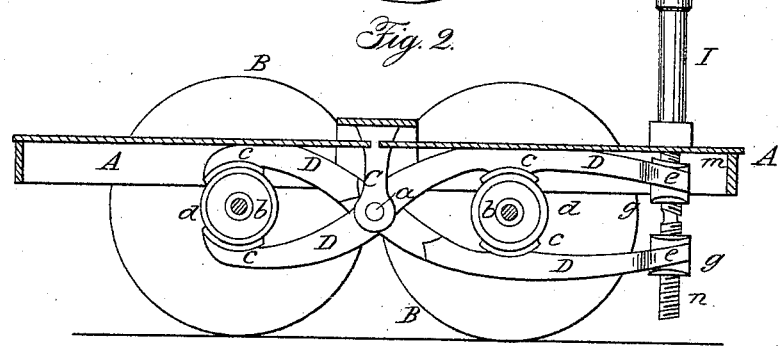
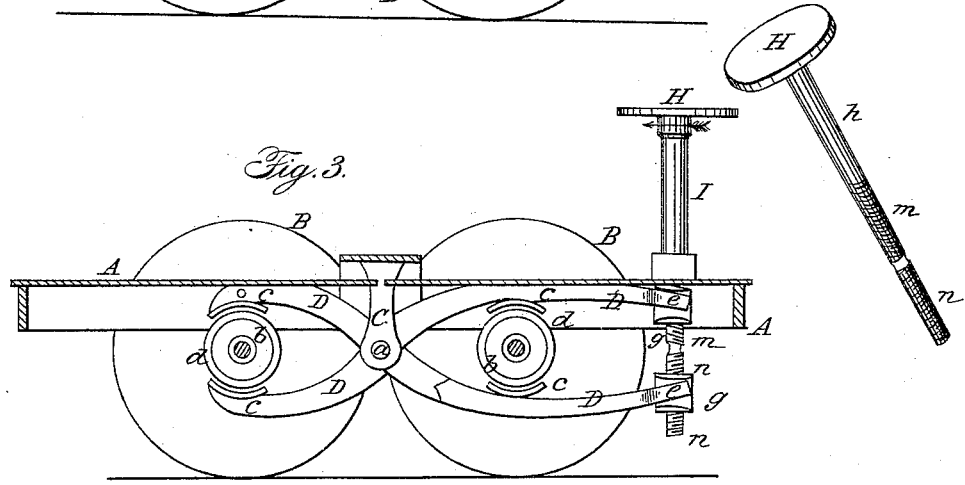
Witnesses:
William Smith
J. M. Koper
Inventor:
P. S. Devlan

UNITED STATES PATENT OFFICE.

P. S. DEVLAN, OF ELIZABETHPORT, NEW JERSEY.

CAR-BRAKE.

Specification of Letters Patent No. 32,758, dated July 9, 1861.

*To all whom it may concern:*

Be it known that I, P. S. DEVLAN, of Elizabethport, county of Union, in the State of New Jersey, have invented certain new and useful Improvements in Car-Brakes; and I do hereby declare that the following is a full and exact description thereof, reference being had to the accompanying drawings, making part of this application.

My invention has for its object a more simple and effective method of braking than has heretofore been adopted, and one which involves less complication of mechanism, and causes less strain and wear on the parts of the apparatus and truck. And my invention consists in the direct application of the screw and lever power combined to the brake clasping the axle, or axles of the truck; in the manner substantially as hereinafter explained.

To enable those skilled in the art to comprehend the nature of my said invention and to make and use the same, I will describe the mode in which I have successfully practiced my invention referring by letters to the accompanying drawings forming part of this specification and in which—

Figure 1. is a perspective view of a car truck to which is applied my improved brake. Fig. 2. is a vertical longitudinal section at the line $x.\ x.$ Fig. 1. Fig. 3. is a similar section with the truck released from the brakes and Fig. 4. is a detail perspective view of the screw shaft.

In the several figures I have designated the same part of the apparatus by the same letter.

A. is the body and B. B. B. B are the wheels of an ordinary four wheel truck about midway of the truck longitudinally and near one side is permanently arranged a stand or hanger C. projecting downward in which is hung a stud or short shaft $a$. This shaft or pivot $a$. is located in the same plane with the axles $b.\ b$ of the truck and equidistant from each of said axles.

D. D. are two bent levers, or arms which are both hung, or pivoted on shaft $a$. (after the fashion of a pair of shear blades) as illustrated and are provided with brake blocks, or friction pads $c.\ c.\ c.\ c.$ the friction surfaces of which blocks $c$. are curved concentrically with or so as to fit to the peripheries of the friction rolls $d.\ d.$ which are firmly secured on the shaft $b.\ b.$ in such locations as to be clasped by the blocks $c$. when required (as will be presently explained). The faces of the rolls $d$. should be about the same width as the blocks $c$. and each should be about —— inches wide. One end of each of the levers D. is forked, or bifurcated as shown at $e.\ e.$ in such manner as to embrace a shoe or driving block $g.\ g.$ (see Fig. 1). Each of these said blocks $g.\ g.$ has formed in it a screw thread or female screw, and each works as a nut on one of the male threads $m.\ n.$ of the vertical shaft $h$. Said shaft is supported in a hollow column, or shaft $i$. which forms its bearing—and is provided at its upper end with a hand wheel H by which it is easily rotated by the operator, or "brakeman." One of the threads $n.$ of the shaft $h$. and its corresponding nut in shoe $g$. is a right hand screw—and the other $m$. and its nut is a "left hand" screw, so that when the shaft $h$. is rotated in one direction the two shoes $g.\ g.$ (which are prevented from turning by being square and clasped by the squarefolk $e$) are caused to approach each other, and when said shaft $h$. is turned in the opposite direction, the said shoes $g.\ g.$ are made to recede from each other. The arms or levers D. D. are halved out at $s.$ where they are jointed around pivot $a$. after the fashion of legs of a pair of pincers, so that the blocks $c.$ of one lever D. are exactly opposite to the blocks or brakes $c$. of the other lever.

The operation of my improved brake will be understood from a few words after what has already been said herein—in connection with the drawing. At Fig. 3, the blocks $c$. are shown out of contact with the peripheries of rolls $d$. as when the truck is running. When it is desired to check the truck the "brakeman" turns the hand wheel H in the direction indicated by the red arrow— whereby the shaft $h$. with its screws $m.\ n.$ is rotated and the shoes $g.\ g.$ are drawn toward each other and the arms D. D. vibrated, or oscillated on their common center $a$. in such manner as to bring the blocks $c$. all simultaneously and with a uniform pressure onto the peripheries of the rolls $d.\ d.$ as illustrated at Fig. 2. By turning the shaft $h$. in an opposite direction the brake blocks $c$. are withdrawn again from the rolls $d$.

From the description and illustration herein given of my invention it will be seen that in its practical application the entire mechanism is exceedingly simple, while, its principle of construction and operation is such that there is no sudden or uneven strain brought on any of the parts, when the brakes are thrown on.

It will be understood that various changes may be made in the detail of construction of my improved apparatus for braking, without departing from the spirit of my invention.

It will be seen that in lieu of extending the arms D. back of stand C. and providing their rear ends with blocks c. to clasp the roll of the hind axle, the said arm D. may not extend back beyond pivot a. and may have in such case but one set of blocks c. to clasp the forward axle, in many instances one set of blocks to clasp one axle roll may be found sufficient.

I do not wish to be understood as laying any claim to the application of the brake blocks to the axle of the truck, or to friction rolls secured on said axle, but What I do claim as my invention and desire to secure by Letters Patent is—

The employment of clasping brake levers D. substantially as hereinbefore described, in combination with the axle, or axles of the truck, and the screw shaft, the whole arranged to operate substantially as described for the purpose set forth.

In testimony whereof I have hereunto set my hand and affixed my seal this fifth day of February 1861.

P. S. DEVLAN. [L. S.]

Witnesses:
 WILLIAM SMITH,
 J. M. ROPES.